C. F. P. ANDERS.
VACUUM BOTTLE.
APPLICATION FILED FEB. 19, 1916.
1,387,337. Patented Aug. 9, 1921.
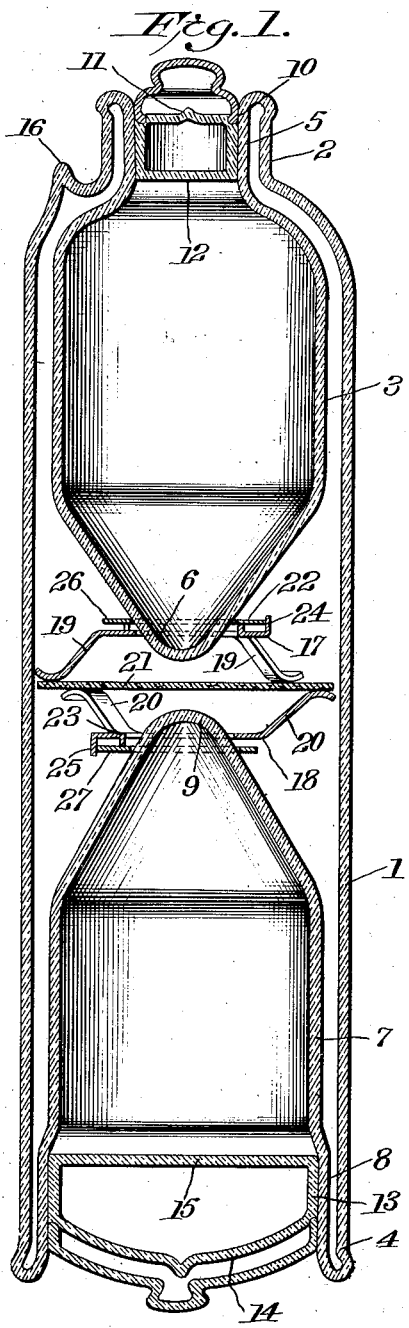
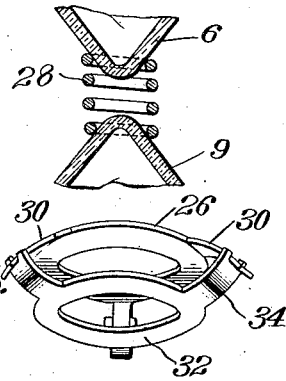
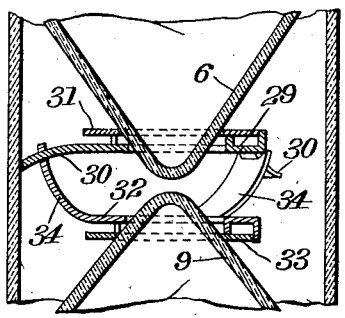
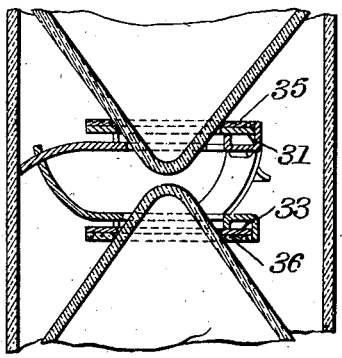
Inventor
Charles F. P. Anders,

UNITED STATES PATENT OFFICE.

CHARLES F. P. ANDERS, OF URBANA, ILLINOIS, ASSIGNOR, BY DIRECT AND MESNE ASSIGNMENTS, TO EUGENE L. GREENEWALD, OF WASHINGTON, DISTRICT OF COLUMBIA.

VACUUM-BOTTLE.

1,387,337.  Specification of Letters Patent.  Patented Aug. 9, 1921.

Original application filed December 2, 1910, Serial No. 595,324. Divided and this application filed February 19, 1916. Serial No. 79,394.

*To all whom it may concern:*

Be it known that I, CHARLES F. P. ANDERS, a subject of the Emperor of Germany, and resident of Urbana, Champaign county, State of Illinois, have invented certain new and useful Improvements in Vacuum-Bottles, of which the following is a specification.

This invention relates to what are known as vacuum bottles and in the particular form shown, it has reference to such bottles having therein two receptacles so that it may hold two separate things. It is of course the purpose of such bottles to maintain the contents at the same temperature whether hot or cold and to prevent the passage of heat from the bottle to the outside atmosphere or the heat from the atmosphere to the contents of the bottle. It has been my object to produce a bottle which can be easily and cheaply made and in which the parts will be firmly supported and at the same time the contents will be more effectively protected against changes of temperature. The novel features of the invention will be apparent from the following description, taken in connection with the accompanying drawings.

In the drawings,

Figure 1 is a longitudinal section through a device embodying the main features of my invention;

Figs. 2, 3 and 4 are sectional views of the portion of a bottle showing modified forms of supporting and insulating means; and Fig. 5 is a detail perspective view of one form of supporting frame which may be used in my device.

As will be seen by reference to Fig. 1, the outer wall 1 is preferably made cylindrical in form having the reduced or contracted upper end or neck 2, and it will of course be understood that this wall is made of glass. An inner receptacle 3 somewhat smaller in diameter than the wall 1 is inserted through the lower end 4 and its reduced or contracted neck 5 is fused to the outer edge of the neck 2, so that the inner receptacle and outer wall are integrally connected at the lip or mouth and are separated at other points by a vacuum space. The lower end 6 of the inner receptacle is tapered as shown for the purpose hereafter described. A second inner receptacle 7 of slightly smaller diameter than the outer wall is inserted through the open end 4 and it has the enlarged neck 8 which is fused at its edge to the lower edge of the outer wall so as to make the inner receptacle in one piece with the outer receptacle. This second inner receptacle has a tapered lower end 9 and before it is placed in position as above described, I place within the outer receptacle and over the end 6 of the inner receptacle 3 a centering, spacing and heat insulating device such as shown in the drawings, the tapered end 9 of the receptacle 7 fitting into one side of this device and the tapered end 6 fitting into the other side. This device serves to support and center the two inner receptacles and this strengthens the device as a whole and prevents breakage, but it is so constructed and arranged that it will practically conduct no heat from the inner receptacle to the outer wall or from one inner receptacle to the other. The neck 5 of the upper inner receptacle is closed by a stopper 10 having the upper wall 11 and the lower wall 12 leaving a vacuum space between for the purpose of insulation. The lower neck 8 has therein a closure 13 having the outer wall 14 and the inner wall 15 leaving a vacuum space whereby the contents of the inner receptacle is protected from changes in temperature outside of the receptacle. At the point 16 there is an opening in the outer wall during the operations above described in the manufacture of the device, but after the inner receptacles and outer wall are in place and fused together in one integral whole the air surrounding the inner receptacles is exhausted through this opening and it is then sealed as shown so as to maintain the vacuum.

The spacing and centering device as shown in Fig. 1 consists of two duplicate frames 17, 18, having the spider legs 19, 20. These spider legs extend from the central ring like portions at an angle outwardly to the outer wall 1, the ends of the legs being curved as shown so as to give a flexible connection or yielding contact with the outer wall. These legs 19 and 20 preferably rest upon opposite sides of a mica disk 21 which fits within the outer wall and which by reason of the fact that it is a poor conductor of heat will serve as an insulation. The central ring like portions of the two frames 17 and 18 have at their inner edge the short upwardly projecting lugs 22, 23 at intervals, and at their outer edge they have longer upwardly projecting lugs 24, 25. Flat ring like disks 26, 27 of mica rest on the lugs 22, 23 and bear at their outer edge against the lugs 24, 25 and as shown the central opening in these mica plates is smaller than the openings in the metal frame. The tapered ends 6 and 9 of the inner receptacles bear on the inner edges of these mica rings and thus the mica rings serve as an insulation preventing the passage of heat between the inner receptacles and the outer wall. The flexible or resilient nature of the parts, furthermore, serves to furnish a yielding support and centering device for both the inner receptacles, holding them securely in position and preventing breakage due to jars. It will be understood that these parts of the device are inserted after the inner receptacle 3 has been secured in place and before the inner receptacle 7 is inserted.

In Fig. 2, I have shown a coil spring 28 which is inserted between the inner pointed ends of the inner receptacles and it serves to support and center those receptacles and at the same time furnishes little opportunity for the passage of heat from one to the other. This form of yielding connection between the parts may be used in place of that described in connection with Fig. 1, but I prefer that shown in Fig. 1.

In Fig. 3, I have shown another modified form of means for supporting and centering the two inner receptacles and in this instance, I make use of an upper frame 29 having radial arms or legs 30 extending at an angle out to the outer wall 1 and on this frame I support the mica disk 31 in the way described in connection with Fig. 1 surrounding the end 6 of the inner receptacle. A second frame 32 carries a mica disk 33 surrounding the end 9 of the inner receptacle and having the curved radial legs 34, which legs have at their outer ends notches so as to make them embrace the legs 30 of the other frame as is shown clearly in Fig. 5. The two frames in this form are therefore flexibly or yieldingly supported from each other and are also supported from the outer wall so as to properly center and support the inner receptacle or receptacles.

In Fig. 4, I have shown a modified construction similar to that shown in Fig. 3 with the exception that I have placed a flat circular disk of fibrous material 35 over the mica disk 31, and the inner receptacle rests against this disk made of fiber. A similar disk 36 is placed on the lower frame on the mica disk 33 and this forms a still more effective means for insulating the inner receptacles to prevent the passage of heat between those receptacles and the outer atmosphere. It will be understood that one or more disks may be used in each of the forms disclosed for supporting the inner receptacles and that various modifications in the structure may be made without departing from my invention.

Having thus described the invention, what I claim is:

1. In the manufacture of hollow wall vacuum insulated containers, the method which comprises separately forming an outer open bottom blank and an inner closed bottom blank, both blanks having necks smaller than the bodies thereof and said inner blank including the neck thereof fitting within the outer blank and the neck thereof, inserting said inner blank into said outer blank and uniting the necks of said blanks, centering and supporting the inner blank at its bottom in the outer blank and closing the said bottom of the outer blank, establishing a vacuum in the space between said blanks through an opening located adjacent the neck of the outer wall but within the margin of the body thereof, and sealing said opening.

2. The method of making double wall containers that comprises separately forming an outer open bottom blank through the open bottom of the latter and an inner closed bottom blank, both blanks having open mouths, inserting said inner blank into said outer blank, centering and supporting said inner blank lengthwise axially and at its bottom end in the outer blank securing said blanks together adjacent the mouths thereof and closing the bottom end of the outer blank.

3. In the manufacture of hollow wall vacuum insulated glass bottles, the method which comprises separately forming an outer open bottom glass blank and an inner closed bottom glass blank, both blanks having open mouths, inserting said inner blank into said outer blank through the open bottom of the latter, yieldingly centering and supporting said inner blank lengthwise axially and at its bottom end in the outer blank, fusing said blanks together adjacent the mouths thereof, closing the bottom end of the outer blank, and establishing and sealing a vacuum in the space between said blanks.

4. In the manufacture of double wall heat-insulated containers, the method which comprises separately forming an outer open bottom blank and an inner closed bottom blank, both blanks having necks smaller than the bodies thereof and said inner blank including the neck thereof fitting within the outer blank and the neck thereof, inserting said inner blank into said outer blank, yieldingly supporting said inner blank adjacent its bottom end to sustain the same lengthwise axially, uniting said inner and outer blanks adjacent the mouths in the necks thereof closing the bottom end of the outer blank, exhausting air from the space between said blanks and sealing said space.

5. A method of making containers which comprises forming an outer wall blank and two receptacle blanks, inserting said receptacle blanks into said wall blank and centering them therein, and joining said receptacle blanks to said wall blank.

6. The method of making double-compartment containers that comprises separately forming an outer tubular wall open at both ends and two receptacle blanks having open mouths, inserting said receptacle blanks into said tubular wall, and uniting the mouths of the receptacle blanks to the open ends of said tubular wall.

7. The method of making containers that comprises forming a tubular outer member having a reduced upper open end and an open lower end, forming two receptacle members, each having an open end and one of which is reduced to fit the reduced upper end of said outer member, inserting the two receptacle members into the outer member through the open bottom end thereof, and securing the open ends of said receptacle members to the open ends of said outer member.

8. The method of making hollow wall containers that comprises separately forming a closed bottom open mouth receptacle blank, an outer blank open at its top and bottom ends, and a third blank, inserting said receptacle blank into said outer blank, uniting the open end of the receptacle blank to said outer blank adjacent an open end of the latter, centering and supporting said receptacle blank at its bottom end and uniting said third blank to the outer blank to close the other open end of the latter.

9. The method of making hollow wall vacuum bottles that comprises separately forming three blanks, viz., a tubular outer blank open at its opposite ends, one of which is a reduced end, a receptacle blank having a closed bottom and a reduced end provided with an open mouth, and a third blank adapted to close the larger end of the outer blank, inserting said receptacle blank into said outer blank, uniting the reduced ends of the receptacle and outer blanks adjacent an open end of the latter, centering and yieldingly supporting the receptacle blank at its bottom, inserting said third blank into the larger end of said outer blank and uniting it thereto, and establishing and sealing a vacuum in the space between said blanks.

10. The method of making vacuum bottles that comprises separately forming an outer blank and two receptacle blanks, inserting said receptacle blanks in said outer blank, uniting the receptacle blanks to said outer blank, withdrawing air from the space between said receptacle blanks and said outer blank, and sealing said space.

11. The method of making vacuum bottles that comprises separately forming an outer tubular blank and two receptacle blanks, inserting said receptacle blanks in said outer blank and uniting the lips thereof to the ends of said outer blank, withdrawing air through a single opening in said outer blank from the space between the outer and receptacle blanks, and sealing said opening.

12. The method of making vacuum bottles that comprises separately forming three blanks, viz., a tubular outer blank having at one end a neck smaller than its body and an open bottom at the other end and an exhaust opening, a first receptacle blank having a neck smaller than its body, a second receptacle blank having a wide mouth, inserting said first receptacle blank into the outer blank through the open bottom end thereof and uniting the necks of the outer blank and first blank, inserting said second blank into the outer blank through the open bottom end of the latter and uniting its open mouth to the open bottom end of the outer blank, withdrawing air through said exhaust opening simultaneously from the spaces between the receptacle blanks and said outer blank, and sealing said exhaust opening.

In testimony whereof, I affix my signature in presence of two witnesses.

CHARLES F. P. ANDERS.

Witnesses:
GLEN CHRISTY,
REGINALD P. BOURASSA.